(12) United States Patent
Fielding et al.

(10) Patent No.: US 7,203,335 B2
(45) Date of Patent: Apr. 10, 2007

(54) SYSTEM AND METHOD FOR EXTRACTING A WATERMARK SIGNAL IN A DIGITAL IMAGE SEQUENCE

(76) Inventors: Gabriel Fielding, Eastman Kodak Company 343 State St., Rochester, NY (US) 14650; Paul W. Jones, Eastman Kodak Company 343 State St., Rochester, NY (US) 14650

( * ) Notice: Subject to any disclaimer, the term of this patent is extended or adjusted under 35 U.S.C. 154(b) by 726 days.

(21) Appl. No.: 09/923,583

(22) Filed: Aug. 7, 2001

(65) Prior Publication Data
US 2003/0068067 A1  Apr. 10, 2003

(51) Int. Cl.
*G06K 9/00* (2006.01)

(52) U.S. Cl. .................. 382/100; 713/176; 382/221

(58) Field of Classification Search .......... 382/100, 382/209, 218–219, 221; 713/176
See application file for complete search history.

(56) References Cited

U.S. PATENT DOCUMENTS

| | | | |
|---|---|---|---|
| 5,809,139 A | 9/1998 | Girod et al. | 380/202 |
| 5,901,178 A | 5/1999 | Lee et al. | 375/240 |
| 5,991,426 A | 11/1999 | Cox et al. | 382/100 |
| 6,026,193 A | 2/2000 | Rhoads | 382/232 |
| 6,044,156 A | 3/2000 | Honsinger et al. | 380/54 |
| 6,069,914 A * | 5/2000 | Cox | 375/150 |
| 6,373,960 B1 * | 4/2002 | Conover et al. | 382/100 |
| 6,473,698 B1 * | 10/2002 | Albert et al. | 702/45 |
| 6,574,349 B1 * | 6/2003 | Linnartz et al. | 382/100 |
| 6,625,298 B1 * | 9/2003 | Maes et al. | 382/100 |
| 6,674,874 B1 * | 1/2004 | Yoshida et al. | 382/100 |
| 6,738,493 B1 * | 5/2004 | Cox et al. | 382/100 |
| 6,934,403 B2 * | 8/2005 | Joo et al. | 382/100 |
| 6,975,743 B2 * | 12/2005 | Venkatesan et al. | 382/100 |
| 2002/0154778 A1 * | 10/2002 | Mihcak et al. | 380/262 |

OTHER PUBLICATIONS

Holliman et al., "Counterfeiting Attacks on Oblivious Block-wise Independent Invisible Watermarking Schemes," IEEE, vol. 9, No. 3, Mar. 2000, pp. 432-441.*
Hartung and Kutter, *Multimedia Watermarking Techniques*, Proc. IEEE, 87(7), pp. 1079-1107 (1999).
Wolfgang et al., *Perceptual Watermarks for Digital Images and Video*, Proc. IEEE 87(7), pp. 1108-1126 (1999).
Kalker and Haitsma, *Efficient Detections Of A Spatial Spread-Spectrum Watermark In MPEG View Streams*, (IEEE Int. Conf. on Image Processing, Vancouver, British Columbia, Sep. 2000).
Michael Elad et al.; Optimal Filters for Gradient-Based Motion Estimation, pp. 195-197, IEEE, Apr. 11, 2000, XP010543262.
Hing Yip Chung et al., Fast Motion Estimation with Search Center Prediction, pp. 952-963, SPIE Optical Engineering, XP002356854.
R. J. Schutten et al., Layered Motion Estimation, Philips Journal of Research, vol. 51, No. 2, 1998, pp. 253-267, XP004126962.

\* cited by examiner

*Primary Examiner*—Jingge Wu
*Assistant Examiner*—Shefali Patel
(74) *Attorney, Agent, or Firm*—Peyton C. Watkins

(57) ABSTRACT

A method for extracting a watermark signal contained in a watermarked digital image sequence having two or more frames, including the steps of estimating correspondences between one or more pairs of frames in the watermarked digital image sequence; computing a displaced frame difference for one or more frames in the watermarked digital image sequence using the correspondences; and extracting the watermark signal from one or more displaced frame differences.

17 Claims, 3 Drawing Sheets

SYSTEM AND METHOD FOR EXTRACTING A WATERMARK SIGNAL IN A DIGITAL IMAGE SEQUENCE

FIELD OF THE INVENTION

The invention relates generally to the field of digital image processing, and in particular to a method for extracting watermarks in digital image sequences.

BACKGROUND OF THE INVENTION

Digital watermarking refers to the embedding of a hidden message in an image or image sequence for such purposes as establishing ownership, tracking the origin of the data, preventing unauthorized copying, or conveying additional information (meta-data) about the content. Watermarking has potential uses in a wide range of products, including digital still and video cameras, printers and other hardcopy output devices, and content delivery services (e.g., Internet-based photofinishing). Recently, there has been significant interest in the electronic distribution and display of theatrical movies, which is termed digital cinema. Studios and distributors have a strong need to protect the movie content from unauthorized use, and watermarking can assist by establishing ownership and tracing the source of stolen content (through the use of hidden date/time/location stamps inserted at the time of the movie distribution and/or presentation). A related application is the distribution of digital movie content into home environments, where a person could download a movie via a broadband connection (such as a cable modem). Again, watermarking can provide a means for tracing the movie content through authorized and unauthorized distribution channels. The present invention relates specifically to the extraction of watermarks in image sequences, and thus it has usefulness in applications such as digital cinema and home delivery of movies.

In these applications, the data that represents image sequence may undergo numerous degradations prior to any attempt to extract the watermark. These degradations can occur because the data was compressed for more efficient storage and transmission; it was converted to an analog signal at some point (such as when recording on a VCR); or it was captured by a camcorder in a movie theater (e.g., pirated material). Such degradations make it significantly more difficult to successfully extract the embedded watermark, regardless of the type of watermarking system that is used.

Numerous watermarking methods have been described in the prior art, including both patents and the technical literature. Many of these methods are described in review papers such as: Hartung and Kutter, Multimedia Watermarking Techniques, Proc. IEEE, 87(7), pp. 1079–1107 (1999), and Wolfgang et al., Perceptual Watermarks for Digital Images and Video, Proc. IEEE, 87(7), pp. 1108–1126 (1999). As noted in these review papers, most research on watermarking techniques has focused on single-frame images, and there are significantly fewer methods that are specific to image sequences (i.e., video watermarking). Of course, a watermarking method that has been designed for single-frame images could be applied to an image sequence by merely repeating the same process for each frame. However, this approach does not take advantage of the multiple frames that are present in an image sequence, which can be used to improve the overall performance of a watermarking system in such applications.

There are several prior art patents that include video-specific watermarking methods: U.S. Pat. No. 5,809,139 issued Sep. 15, 1998 to Girod et al. entitled Watermarking Method and Apparatus for Compressed Digital Video, B. Girod et al., Sept. 15, 1998; U.S. Pat. No. 5,901,178 issued May 4, 1999 to Lee et al. entitled Post-Compression Hidden Data Transport for Video; U.S. Pat. No. 5,991,426 issued Nov. 23, 1999 to Cox et al. entitled Field-Based Watermark Insertion and Detection; and U.S. Pat. No. 6,026,193 issued Feb. 15, 2000 to Rhoads entitled Video Steganography.

In the patents by Girod et al. and Lee et al., the methods are designed for directly embedding a watermark in compressed frequency-domain video streams (such as MPEG-encoded sequences). The patent by Cox et al. describes a method for alternately embedding positive and negative watermarks in consecutive fields of an interlaced video signal; this method is not suitable for progressively scanned image sequences such as those used in digital cinema applications. The patent by Rhoads discloses the basic concept of using multiple watermarked frames from an image sequence to extract the watermark with a higher degree of confidence than would be obtained with only a single frame. However, in the patent by Rhoads, the same watermark pattern must be used for each frame in order to combine the frames for improved performance. Particularly in watermarking system for image sequences, it may be desirable to change the watermark pattern from frame to frame for the purpose of decreasing visibility, increasing security, and/or distributing the embedded message data across multiple frames. Moreover, none of the methods described in the aforementioned patents make direct use of the repetitive nature of image content in the sequence, i.e., the high degree of correlation that exists between consecutive frames of a sequence, as a means of improving watermark extraction performance.

In a paper by Kalker and Haitsma entitled "Efficient detection of a spatial spread-spectrum watermark in MPEG video streams" (IEEE Int. Conf. on Image Processing, Vancouver, British Columbia, Sept. 2000), a method is disclosed for the computationally efficient detection of watermarks that have been embedded in an MPEG compressed video sequence. Relevant to the present invention, the authors make the observation that a residual frame in an MPEG sequence may have more favorable characteristics for watermark detection because of reduced image energy. Their method is specific to MPEG compressed frames, and the reduction in image energy for residual frames is limited by the constraints of the MPEG encoding process. Moreover, only certain frames in an MPEG sequence are residual frames, and thus the benefits of reduced image energy are only achieved in a fraction of the total number of frames. Furthermore, in heavily compressed MPEG sequences, much of the information (including both image content as well as the watermark signal) in a residual frame is discarded during the encoding process, thus lowering the effectiveness of the watermark extraction process on the residual frames.

There is a need therefore for an improved watermark extraction technique for image sequence data that: (1) increases the successful extraction rate of embedded watermarks; (2) works with any watermark embedding method; (3) does not require the same watermark pattern in each frame; and (4) can be applied to any type of image sequence data and is not constrained to MPEG compressed sequences.

SUMMARY OF THE INVENTION

The need is met according to the present invention by providing a method for extracting a watermark signal contained in a watermarked digital image sequence having two or more frames, including the steps of estimating correspondences between one or more pairs of frames in the watermarked digital image sequence; computing a displaced frame difference for one or more frames in the watermarked digital image sequence using the correspondences; and extracting the watermark signal from one or more displaced frame differences.

ADVANTAGES

The present invention improves the successful extraction rate of a watermark signal in an image sequence by removing image content prior to the watermark extraction process. This method is independent of the actual watermarking method, and it can be applied to any type of image sequence data. In addition, it does not require the original image sequence nor does it require any user intervention. Moreover, the method does not require the same watermarking pattern to be used in each frame.

DETAILED DESCRIPTION OF THE INVENTION

The present invention improves upon prior art by removing image content prior to the watermark extraction process. As discussed herein, image content (that is, components of the original image that are unrelated to the embedded watermark signal) acts as a noise signal during the extraction process, thus lowering the likelihood of a successful extraction. Because image content is highly correlated in neighboring frames of an image sequence, it is possible to estimate the correspondences between frames (using motion estimation methods for example) and compute a displaced frame difference prior to watermark extraction.

It is noted that the goal of reducing the image content prior to watermark extraction could potentially be performed by subtracting the original (i.e. unwatermarked) frames from the corresponding watermarked frames, without the need for estimating correspondences between frames. However, there are a several issues that make this approach very difficult to apply in practice. First, it requires the original frames, which may not be available in every application. For example, a consumer device that detects the watermark and then takes some action (such as disabling the device) would not have access to the original frames. It is much more desirable to have a system that does not require the original content (which is known as a "blind" or "oblivious" watermarking method). Second, the image sequence that contains the watermark may have undergone substantial degradations, such as sharpness loss, magnification changes, contrast and brightness changes, etc. The subtraction of the undegraded original frames from the degraded watermarked frames will result in a very incomplete removal of the image content, and in fact, this process could introduce additional content that could interfere with the extraction process. In comparison, the present invention only uses the frames within the watermarked sequence itself, which typically have undergone the same degradations. Finally, the original and watermarked image sequence frames may not have a 1-to-1 correspondence. This can occur when the watermarked sequence has been copied at a different temporal sampling rate, such as when a camcorder (operating at 30 or 60 Hz) is used to capture (illegally) a movie that has been projected in a digital cinema theater (at 24 Hz). In this case, it is necessary to align the frames, which is often done using laborious manual methods. The displaced frame differencing method of the present invention can be performed using automated means, and thus requires no user intervention.

The present invention is preferably implemented by a programmed digital computer. The computer can be a general-purpose digital computer or a special-purpose computer for digital image processing. It is within the ordinary skill in the programming art to provide a computer program for practicing the present invention from the following description of the invention.

Figure 1:
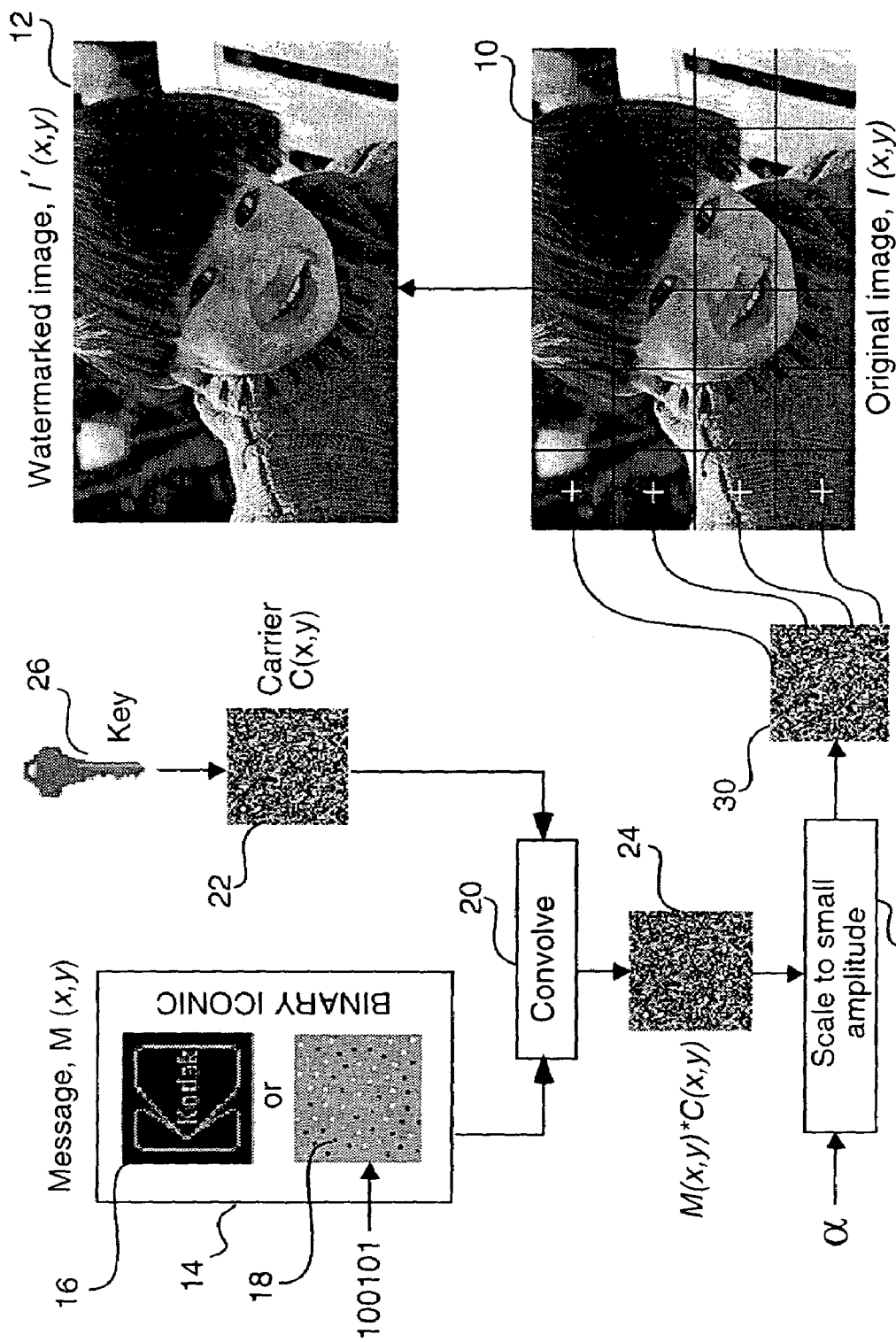
FIG. 1 is a prior art method for embedding a watermark in an original image.

A preferred data embedding technique for use with the present invention is disclosed in U.S. Pat. No. 6,044,156 issued Mar. 28, 2000 to Honsinger et al. entitled *Method for Generating an Improved Carrier for Use in an Image Data Embedding Application*. This patent is incorporated by reference herein. Referring to FIG. 1, in this technique, an original two-dimensional image 10, $I(x,y)$, is processed to produce a watermarked image 12, $I'(x,y)$. A two-dimensional message 14, $M(x,y)$, represents the data to be embedded in the original image. In its most general form, the message 14 is an image, and it can represent an icon 16 (e.g., a trademark), or it can represent the bits 18 in a binary message. In the latter case, the on and off states of the bits are represented as plus and minus ones (more specifically, positive and negative delta functions), which are placed in predefined and unique locations across the message image. Examples of iconic message data are trademarks, corporate logos or other arbitrary images. In order to minimize the message energy, an edge map of the icon is often used instead of the actual icon. Examples of binary message data are 32-bit representations of URL's, and copyright ID codes, or authentication information.

As shown in FIG. 1, the fundamental steps for embedding message data in an original image with this method are:

1. A n×n message image 14, $M(x,y)$, is generated from the message data;
2. The message image 14 is circularly convolved 20 with a n×n carrier image 22, $C(x,y)$, to produce a n×n dispersed message image 24. The carrier image may be produced using a secure key 26 as is known in the prior art;
3. The dispersed message image 24 is scaled 28 in amplitude using a multiplicative factor a; and
4. The scaled dispersed message image 30 is added to the original image 10 as contiguous n×n tiles to form a watermarked image 12, $I'(x,y)$.

The tiling of the dispersed message images forms the watermark pattern that is combined with the original image. The scaling factor α is an arbitrary constant chosen to make the watermark pattern simultaneously invisible and robust to common processing. Typically, the size of the dispersed message image 24 is chosen to be smaller than the size of original image 10, and the tiling process allows the scaled dispersed message image 30 to be repetitively embedded over the extent of the original image 10. The repetitive structure provides robustness to the watermark when image processing operations (such as cropping, compression, low-pass filtering, etc.) are applied to the watermarked image.

Other watermarking techniques use different methods for embedding the message data, but the repetitive nature of the embedding process is a common aspect because of this improved robustness.

This embedding process for each tile can be described mathematically as:

$$I'(x,y) = \alpha[M(x,y) * C(x,y)] + I(x,y), \quad (1)$$

where the symbol * represents circular convolution. From Fourier theory, spatial convolution is equivalent in the frequency domain to adding phase while multiplying magnitudes. Therefore, the effect of convolving the message image 14 with the carrier image 22 is to distribute the message energy in accordance with the phase of the carrier image and to modulate the amplitude spectrum of the message image with the amplitude spectrum of the carrier image. If the message image were a single delta function $\delta(x, y)$ and the carrier image had random phase and substantially flat Fourier magnitude, the effect of convolving with the carrier image would be to distribute the delta function over space. Similarly, the effect of convolving a message image with a random phase carrier image is to spatially disperse the message energy.

Figure 2:
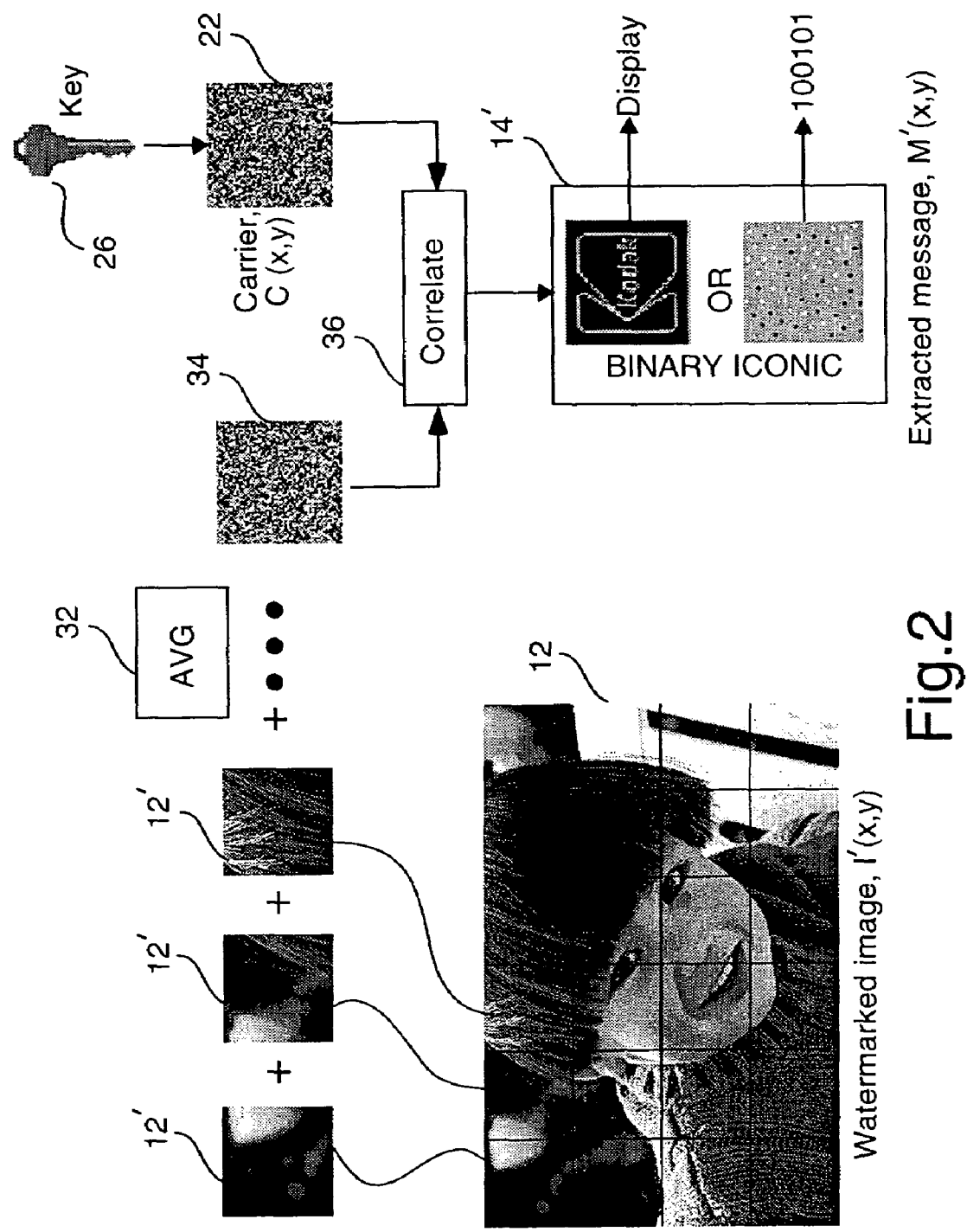
FIG. 2 is a prior art method for extracting a watermark from an image containing an embedded watermark.

As shown in FIG. 2, the process as described by Honsinger et al. for extracting the message data from a watermarked image 12 consists of the following fundamental steps:
1. Contiguous n×n tiles 12' are formed from the watermarked image 12, I'(x,y);
2. The tiles 12' are averaged 32 across each spatial location (x,y) to form an averaged tile 34;
3. The averaged tile 34 is circularly correlated 36 with the n×n carrier image 22 C(x,y) to produce an extracted n×n message image 14', M'(x,y); and
4. The message data is recovered from the extracted message image 14'.

The averaging 32 of the individual tiles 12' produces a better estimate of the message data (i.e., it improves the signal-to-noise ratio) because the dispersed message image in each tile will add constructively (since it is the same in each tile), while the corresponding original image content in each tile will generally add destructively (since it is typically different in each tile).

This watermark extraction process can be described mathematically as:

$$M'(x,y) = I'(x,y) \otimes C(x,y) = \alpha[M(x,y) * C(x,y)]$$
$$\otimes C(x,y) + I(x,y) \otimes C(x,y) \quad (2)$$

where the symbol, $\otimes$, represents circular correlation. Correlation is similar to convolution in that Fourier magnitudes also multiply. In correlation, however, phase subtracts. Therefore, the phase of the carrier image subtracts when the watermarked image is correlated with the carrier image, thus leaving the message image. Indeed, if we again assume that the carrier image is designed to have a substantially flat Fourier amplitude, then the process of correlation of the carrier on the watermarked image Eq. 2, can be reduced to:

$$M'(x,y) = \alpha M(x,y) + \text{noise}, \quad (3)$$

where $$\text{noise} = I(x,y) \otimes C(x,y). \quad (4)$$

That is, the extracted message image is a scaled version of the original message image plus noise due to the cross correlation of the original image with the carrier image.

As described previously, the typical application of this watermarking extraction process to an image requires the assumption that the underlying content in each tile adds destructively. If this is the case, the noise term in Eq. 3 will be reduced, with greater reductions as more tiles are added together. This reduction in the noise term improves the likelihood of a successful extraction. However, in practice, a relatively small number of tiles are added together, and the image content may still be significant. Moreover, in some images, there may be similar image content in each tile, and the image content will add constructively, not destructively, thus making the extraction process more difficult. The present invention is intended to improve the successful extraction rate by reducing the image content in each tile prior to summation and correlation with the carrier, thus minimizing the noise term in Eqs. 3 and 4. This reduction in image content is achieved by performing displaced frame differencing on one or more frames in the watermarked digital image sequence.

Figure 3:
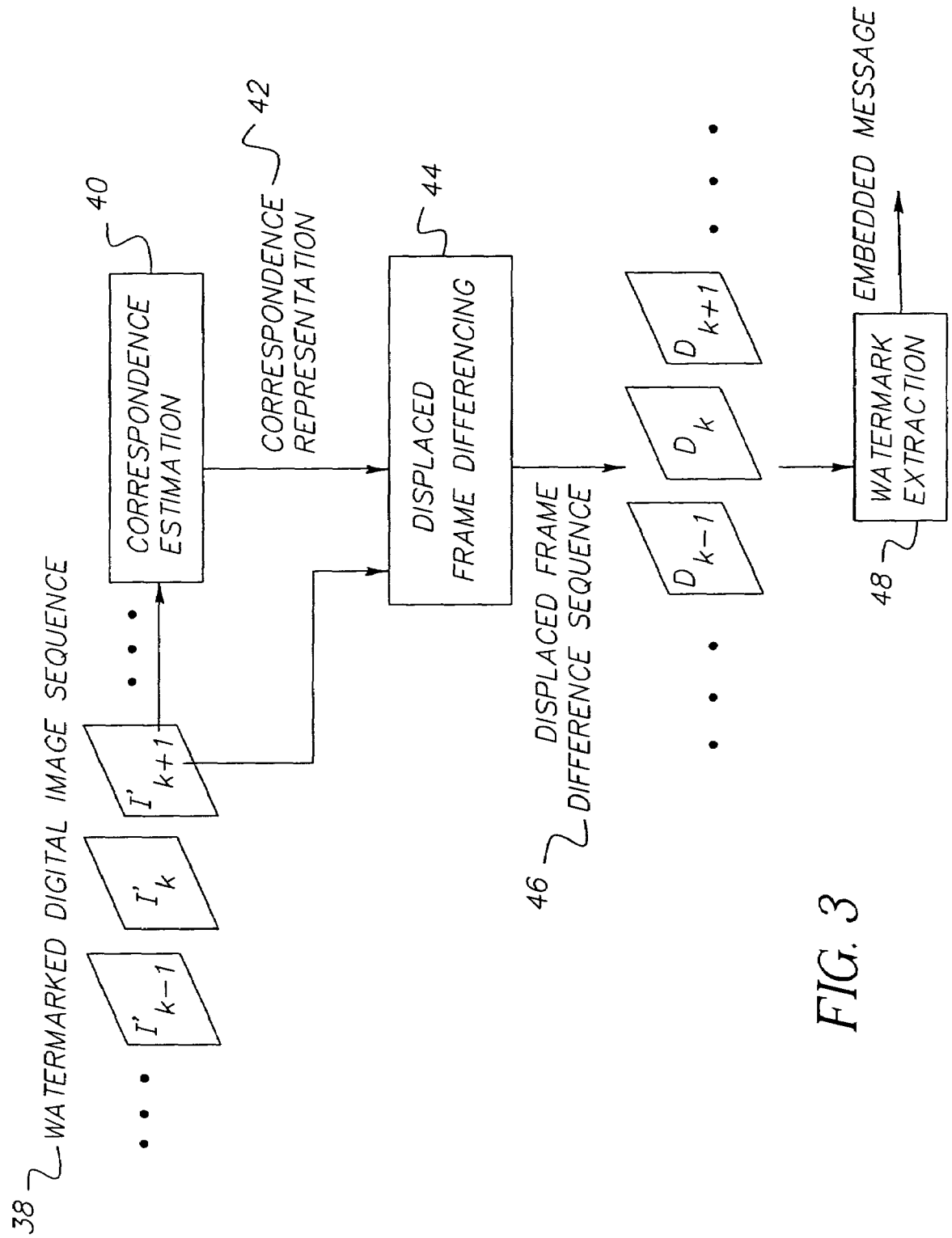
FIG. 3 illustrates the generation of a displaced frame difference image sequence prior to watermark extraction for the purpose of improving the reliability of the extraction and reducing content dependence of the watermark extraction process.

A block diagram that illustrates the present invention is shown in FIG. 3. A watermarked image sequence 38 is denoted as $I'_k(x,y)$, where the subscript k is an index indicating which frame in the sequence is being referenced. A correspondence estimation unit 40 computes one or more correspondences 42 between pairs of frames in the image sequence. The actual form of the correspondence representation depends on the specific method used to compute the correspondence. A typical correspondence representation is a motion vector field (denoted by MVF(k,j)), where a motion vector indicates one or more correspondence points between a given pixel in frame $I'_k(x,y)$ and another pixel in frame $I'_j(x',y')$, where $j \neq k$. A motion vector field is typically a grid of two or more scalar values per grid point. The most common case of motion vector field is MVF(k,j)=[$u_{k,j}(x,y)$, $v_{k,j}(x,y)$] where the scalar fields $u_{k,j}(x,y)$ and $v_{k,j}(x,y)$ represent the horizontal and vertical displacements respectively of frame k relative to frame j at a point (x,y) in frame j. The pairs of frames used for correspondence estimation are typically adjacent frames in the sequence; however they may also be any pair of frames (not necessarily consecutive) in the image sequence. The actual correspondence estimation scheme can be any method that allows a pixel to be placed in correspondence with one or more other pixels in neighboring frames. Multiple component motion estimation methods may provide more than one motion vector per grid point in the case of shadows and transparency. Also, parametric representations of motion can be used as well as non-uniform grid spacings and ad-hoc combinations of parametric and grid-based motion representations as well as layered motion estimation methods and representations. Another correspondence estimation method is stereo matching where the correspondence representation is a disparity map. All of these various correspondence estimation techniques and correspondence representations are considered within the scope of the present invention.

Alternatively, a compressed video stream with an embedded watermark may be provided where the compressed stream uses motion vectors as part of the compression process. These motion vectors are included in the compressed stream and are used during the decompression process. These motion vectors may be used in the present invention rather than (or in addition to) using motion vector fields computed using a separate motion estimation unit. In this application, it is assumed that the compressed image sequence has been decompressed to form a reconstructed image sequence. The motion vectors from the compressed video stream and/or the motion vectors produced by correspondence estimation unit 40 are then applied to the frames of the reconstructed image sequence. In comparison, the method disclosed by Kalker and Haitsma makes use of the residual frames that are present in an MPEG compressed stream, and not the reconstructed frames of the image sequence. As mentioned previously, the MPEG residual frames correspond only to a portion of the total frames in the compressed image sequence, whereas the present invention can be applied to every frame in the reconstructed image sequence. Moreover, the image energy in the residual frames of an MPEG compressed sequence may not be minimized because of constraints of the MPEG encoding process, e.g., the residual frames typically are not formed from directly adjacent frames, and the motion estimation process may be suboptimal because of computational requirements. The present invention is not constrained by these limitations.

For a given frame $I'_k(x,y)$ in the watermarked digital image sequence 38, the associated motion vector field(s) MVF(k,j) 42 and corresponding frame(s) $I'_j(x,y)$, $j \neq k$, from the image sequence are then passed into a displaced frame differencing unit 44. The displaced frame differencing unit 44 takes the frame(s) $I'_j(x,y)$ and motion vector field(s) MVF(k,j) and produces an estimated frame $\tilde{I}'_k(x,y)$ of the current frame $I'_k(x,y)$. This estimated frame may be given generally by a weighted sum of any frames in the sequence:

$$\tilde{I}'_k(x,y) = \sum_j \alpha_j I'_j(x + u_{k,j}(x,y), y + v_{k,j}(x,y)) \quad (5)$$

where $\alpha_j$ is the weight that is applied to the $j^{th}$ frame. Using more than one frame can lead to a more accurate estimate for the current frame $I'_k(x,y)$, which will improve the performance of the present invention. Additional summation terms may be added to (5) to incorporate multiple correspondences per frame pair as expected from image sequences with transparencies and shadows.

This estimated frame is then subtracted from the current frame $I'_k(x,y)$ to produce a content-minimized version of the $k^{th}$ frame, denoted by the displaced frame difference $D_k(x,y)$ 46:

$$D_k(x,y) = I'_k(x,y) - \tilde{I}'_k(x,y). \quad (6)$$

These frame differences are then passed to the watermark extraction unit 48, for the normal processing that would be done in the extraction process to produce an extracted message:

$$M'(x,y) = D(x,y) \otimes C(x,y). \quad (7)$$

For the preferred watermark embedding and extraction process in U.S. Pat. No. 6,044,156, the advantage of the displaced frame differencing can be shown by analyzing the watermark extraction step. For simplicity, we will consider only one-frame differencing, i.e., $$D_k(x,y) = I'_k(x,y) - I'_j(x+u_{k,j}(x,y), y+v_{k,j}(x,j)), \quad (8)$$

but the analysis is the same for the weighted sum of Eq. 5. Now, there are two cases that must be considered: (1) the same carrier C(x,y) is used for each frame, and (2) different carriers $C_k(x,y)$ are used for each frame. The message M(x,y) is assumed to be the same for each frame, although similar results are obtained if the message is also varied from frame to frame.

Case 1 (Same Carrier)

From Eq. 1, the watermarked image for the $k^{th}$ frame is given by:

$$I'_k(x,y) = \alpha[M(x,y)*C(x,y)] + I_k(x,y) \quad (9)$$

and motion-compensated version of the watermarked $j^{th}$ frame is given by:

$$I'_j(x+u_{k,j}(x,y), y+v_{k,j}(x,y)) = \alpha[M(x+u_{k,j}(x,y), y+v_{k,j}(x,y)) \\ *C(x+u_{k,j}(x,y), y+v_{k,j}(x,y))] + I_j(x+u_{k,j}(x,y), y+v_{k,j}(x,y)). \quad (10)$$

If we assume the motion-compensation of the $j^{th}$ frame produces a good estimate of the $k^{th}$ frame (an assumption known as image constancy), then:

$$I_k(x,y) - I_j(x+u_{k,j}(x,y), y+v_{k,j}(x,y)) \cong 0, \quad (11)$$

which yields the following displaced frame difference, $$D_k(x,y) = \alpha[M(x,y)*C(x,y)] - \alpha[M(x+u_{k,j}(x,y), y+v_{k,j}(x,y)) \\ *C(x+u_{k,j}(x,y), y+v_{k,j}(x,y))]. \quad (12)$$

If there is very little motion (u,v≈0), the watermark signal will cancel and the extraction will fail. However, in practice, there is motion throughout a sequence, and this motion tends to vary substantially from tile to tile. Hence, the summation of the tiles remains the same and the correlation process produces a similar result to Eq. 3:

$$M'(x,y) = \alpha M(x,y) + noise_2, \quad (13)$$

where the $noise_2$ term is a function of the shifted watermarked signal from the jth frame:

$$noise_2 = \alpha M(x+u_{k,j}(x,y), y+v_{k,j}(x,y)) * [C(x+u_{k,j}(x,y), y+v_{k,j}(x,y)) \\ \otimes C(x,y)]. \quad (14)$$

The correlation of the shifted carrier and the original carrier will be limited due to the presence of different motion components within and across the image tiles. In addition, this noise term is been scaled by the factor $\alpha$ and the resulting amplitude of the $noise_2$ term will generally be less than the noise term in Eq. 3.

Case 2 (Different Carriers)

For the case where the carrier changes from frame to frame, there are even greater benefits provided by the present invention. For a carrier $C_k(x,y)$ that varies with each frame, we can rewrite Eq. 1 as:

$$I'_k(x,y) = \alpha[M(x,y)*C_k(x,y)] + I_k(x,y), \quad (15)$$

and $$D_k(x,y) = \alpha[M(x,y)*C_k(x,y)] - \alpha[M(x+u_{k,j}(x,y), y+v_{k,j}(x,y)) \\ *C_j(x+u_{k,j}(x,y), y+v_{k,j}(x,y))]. \quad (16)$$

Correlating this signal with the correct carrier for a given frame $$M'(x,y) = D_k(x,y) \otimes C_k(x,y) = \alpha M(x,y) + noise_3, \quad (17)$$

where noise3 is given by:

$$noise_3 = \alpha M(x+u_{k,j}(x,y), y+v_{k,j}(x,y)) * [C_j(x+u_{k,j}(x,y), y+v_{k,j}(x,y)) \\ \otimes C_k(x,y)]. \quad (18)$$

Because the two different carrier signals, $C_j$ and $C_k$ where $k \neq j$, are uncorrelated, the noise term is close to zero everywhere. Thus the $noise_3$ term is considerable smaller than the earlier noise terms we have presented. Thus, the extracted message image is a scaled version of the original message image with virtually no noise from the image content.

Although the present invention has been described using the preferred data embedding and extraction methods of Honsinger et al. that use two-dimensional carrier images, it is noted that the same concepts can be applied to other watermarking embedding and extraction methods. For example, the present invention can aid in the extraction of watermarks for embedded using alternative watermarking techniques, including those that embed directly in the Fourier domain techniques such as in the method of Girod et al, and those that embed in the spatial domain such as in the method of Cox et al. In most watermarking methods, the robustness of the extraction process is dependent upon the image content, and the present invention can minimize this dependence.

The invention has been described in detail with particular reference to certain preferred embodiments thereof, but it will be understood that variations and modifications can be effected within the spirit and scope of the invention.

PARTS LIST

| | |
|---|---|
| 10 | two dimensional image |
| 12 | watermarked image sequence |
| 12' | contiguous tiles |
| 14 | message image |
| 14' | extracted message image |
| 16 | icon |
| 18 | bits |
| 20 | circular convolution image step |
| 22 | carrier image |
| 24 | dispersed message image |
| 26 | secure key |
| 28 | scale image step |
| 30 | scaled dispersed message image |
| 32 | averaging of individual tiles step |
| 34 | averaged tile |
| 36 | circular correlation step |
| 38 | watermarked image sequence |
| 40 | correspondence estimation unit |
| 42 | correspondence representation |
| 44 | displaced frame differencing unit |
| 46 | displaced frame difference sequence |
| 48 | watermark extraction unit |

What is claimed is:

1. A method for extracting a watermark signal contained in a watermarked digital image sequence, having two or more frames represented by pixel values, wherein the watermark is extracted without using frames from an original unwatermarked digital image sequence, comprising the steps of:
   a) estimating pixel correspondences between one or more pairs of frames in the watermarked digital image sequence;
   b) computing one or more displaced frame differences for one or more frames in the watermarked digital image sequence using the pixel correspondences computed in step a) without reference to the original unwatermarked digital image sequence; wherein step (b) further comprises the steps of:
      (i) computing, without reference to the original unwatermarked digital image sequence, one or more estimated frames using the pixel correspondence computed in step a), and each estimated frame, which is represented by estimated pixel values, has a corresponding frame in the watermarked digital image sequence;
      (ii) subtracting estimated pixel values of each estimated frame from pixel values of the corresponding frame of the watermarked digital image sequence to produce the one or more displaced frame differences; and
   c) extracting the watermark signal from one or more displaced frame differences.

2. The method claimed in claim 1, wherein the correspondences are estimated using gradient-based optical flow.

3. The method claimed in claim 1, wherein the correspondences are estimated using block-based matching.

4. The method claimed in claim 1, wherein the correspondences are estimated using layered motion estimation.

5. The method claimed in claim 1, wherein the correspondences are estimated using a parametric region-based motion estimation.

6. The method claimed in claim 1, wherein the watermarked digital image sequence has been compressed to form a compressed image stream and at least a portion of the correspondences are estimated from motion vectors available in the compressed image stream.

7. The method claimed in claim 1, wherein displaced frame difference for each frame is computed using the correspondences with one additional frame in the watermarked digital image sequence.

8. The method claimed in claim 1, wherein displaced frame difference for each frame is computed using the correspondences with two or more additional frames in the watermarked digital image sequence.

9. A system for extracting a watermark signal contained in a watermarked digital image sequence represented by pixel values, wherein the watermark is extracted without using frames from an original unwatermarked digital image sequence, having two or more frames, comprising:
   a) means for estimating pixel correspondences between one or more pairs of frames in the watermarked digital image sequence;
   b) means for computing a displaced frame difference for one or more frames in the watermarked digital image sequence using the pixel correspondences computed in step a) without reference to the original unwatermarked digital image sequence; wherein the means for computing further comprises:
      (i) means for computing, without reference to the original unwatermarked digital image sequence, one or more estimated frames using the pixel correspondence computed in step a), and each estimated frame, which is represented by estimated pixel values, has a corresponding frame in the watermarked digital image sequence;
      (ii) means for subtracting estimated pixel values of each estimated frame from pixel values of the corresponding frame of the watermarked digital image sequence to produce the one or more displaced frame differences; and
   c) means for extracting the watermark signal from one or more displaced frame differences.

10. The system claimed in claim 9, wherein the means for computing the displaced frame difference further includes means for forming an estimated frame and means for subtracting the estimated frame from the corresponding frame in the watermarked digital image sequence.

11. The system claimed in claim 9, wherein the means for estimating correspondences employs gradient-based optical flow.

12. The system claimed in claim 9, wherein the means for estimating correspondences employs block-based matching.

13. The system claimed in claim 9, wherein the means for estimating correspondences employs layered motion estimation.

14. The system claimed in claim 9, wherein the means for estimating correspondences employs parametric region-based motion estimation.

15. The system claimed in claim 9, wherein the watermarked digital image sequence has been compressed to form a compressed image stream and the means for estimating correspondences employs at least a portion of the motion vectors available in the compressed image stream.

16. The system claimed in claim 9, wherein the means for computing the displaced frame difference for each frame employs correspondences with one additional frame in the watermarked digital image sequence.

17. The system claimed in claim 9, wherein the means for computing the displaced frame difference for each frame employs correspondences with two or more additional frames in the watermarked digital image sequence.

* * * * *